United States Patent [19]

Neeley

[11] 3,916,370

[45] Oct. 28, 1975

[54] APPARATUS FOR CONTROLLING THE TRANSFER OF SEISMIC DATA FROM MAGNETIC TAPE STORAGE TO A PHOTOGRAPHIC RECORDING

[75] Inventor: Walter P. Neeley, Irving, Tex.

[73] Assignee: Mobil Oil Corporation, New York, N.Y.

[22] Filed: June 24, 1974

[21] Appl. No.: 482,740

[52] U.S. Cl. 340/15.5 DS; 340/15.5 TG; 346/33 C; 346/110; 340/172.5
[51] Int. Cl.² ... G01V 1/24; G01D 9/42; G01V 1/32
[58] Field of Search ............ 340/15.5 DS, 15.5 TG; 346/33 C, 110

[56] References Cited
UNITED STATES PATENTS
3,714,663  1/1973  Smith .................... 340/15.5 TG

*Primary Examiner*—Maynard R. Wilbur
*Assistant Examiner*—H. A. Birmiel
*Attorney, Agent, or Firm*—C. A. Huggett; George W. Hager, Jr.

[57] ABSTRACT

A seismic data processing system comprises a multiplexer for applying seismic data from magnetic tape storage to a cathode-ray tube to modulate its electron beam. A photographic drum plotter provides a recording of the seismic data displayed on the face of the cathode-ray tube. A timing line generator, a timing number generator, a trace mark generator, and an annotation generator provide for modulation signals which are applied to the cathode-ray tube for the production of timing lines, timing numbers, centerline trace markings, and alpha-numeric annotation data on the photographic recording. An interface controller provides for timing and control signals for selecting the rotational speed of the drum plotter and the data rate at which the seismic data is recorded. The interface controller further detects the rotational position of the drum plotter and enables the timing line, timing number, trace mark, and annotation generators to provide the appropriate modulation signals to the cathode-ray tube at the proper times during the revolutions of the drum plotter.

4 Claims, 16 Drawing Figures

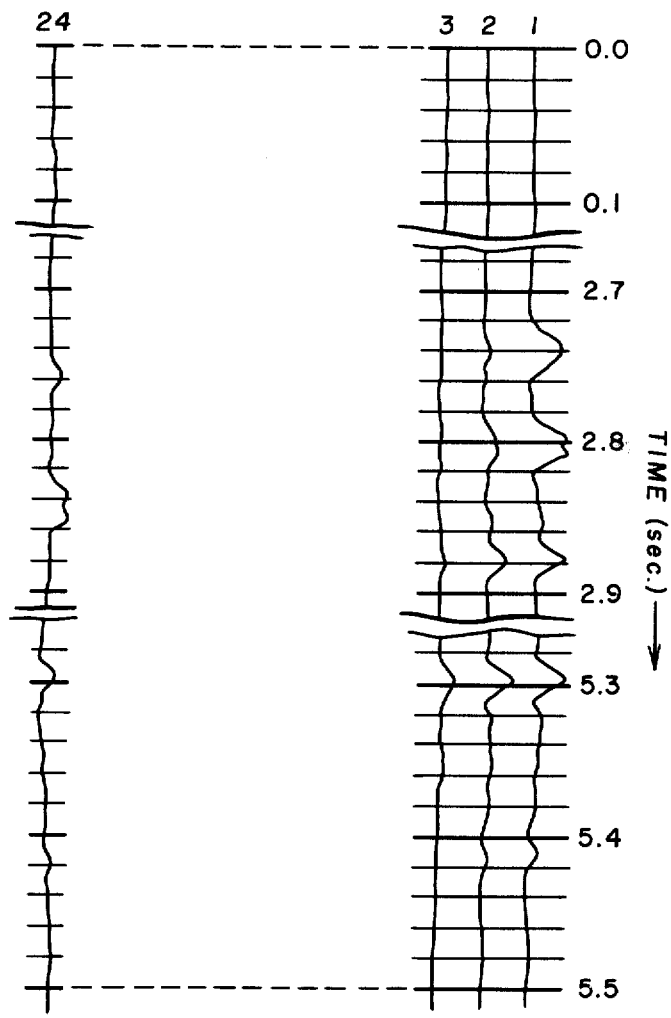

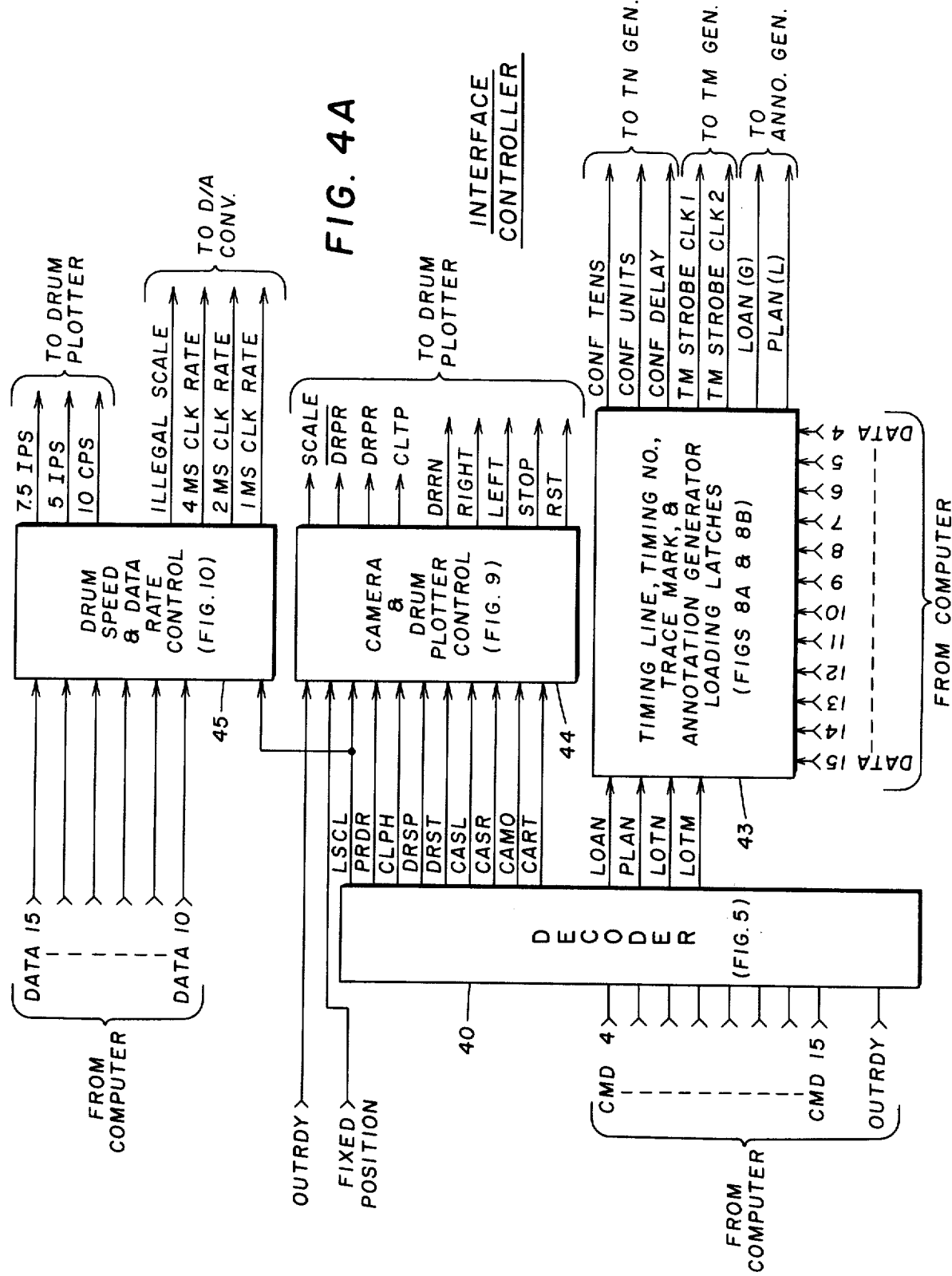

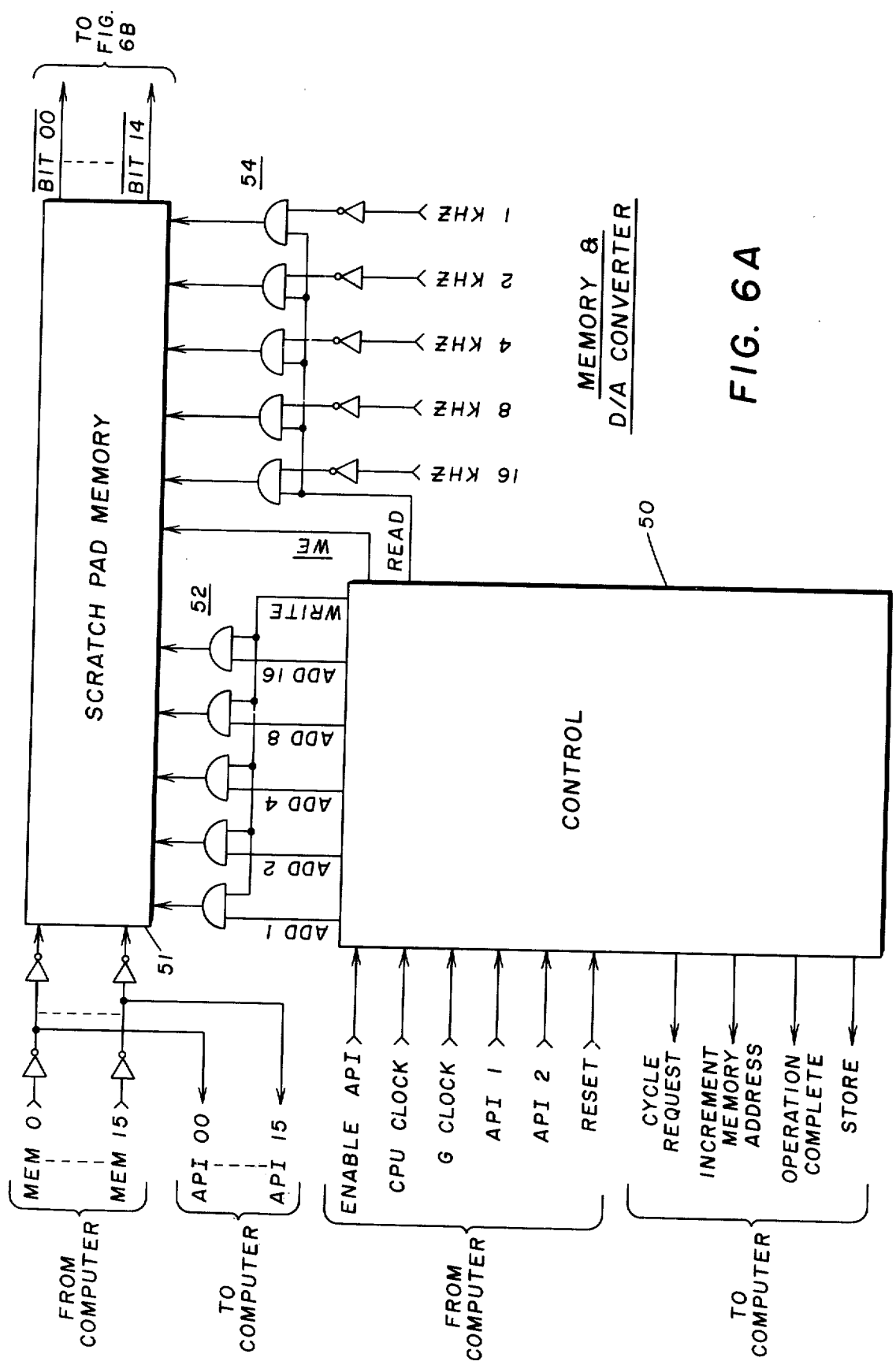

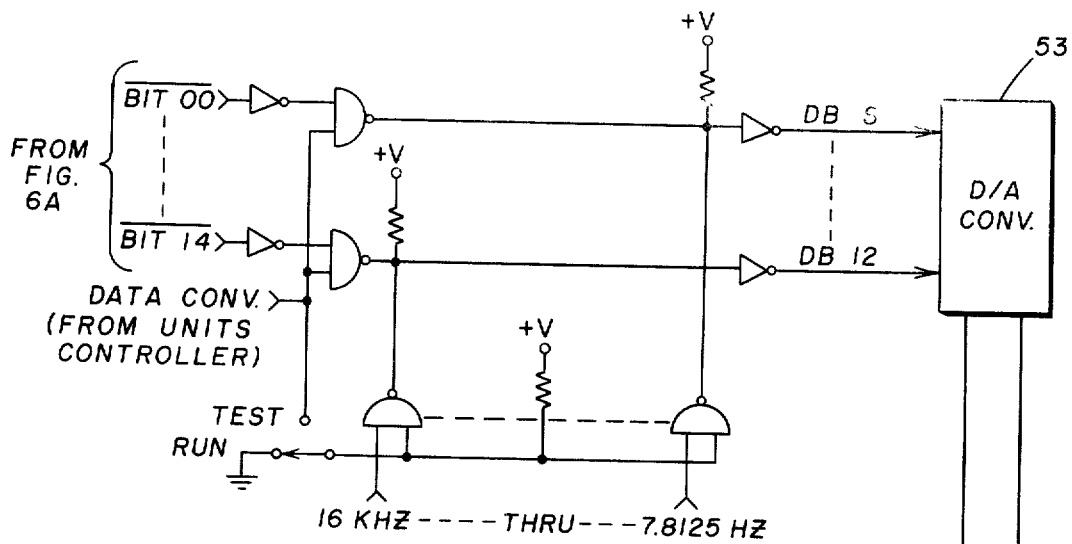
FIG. 6B
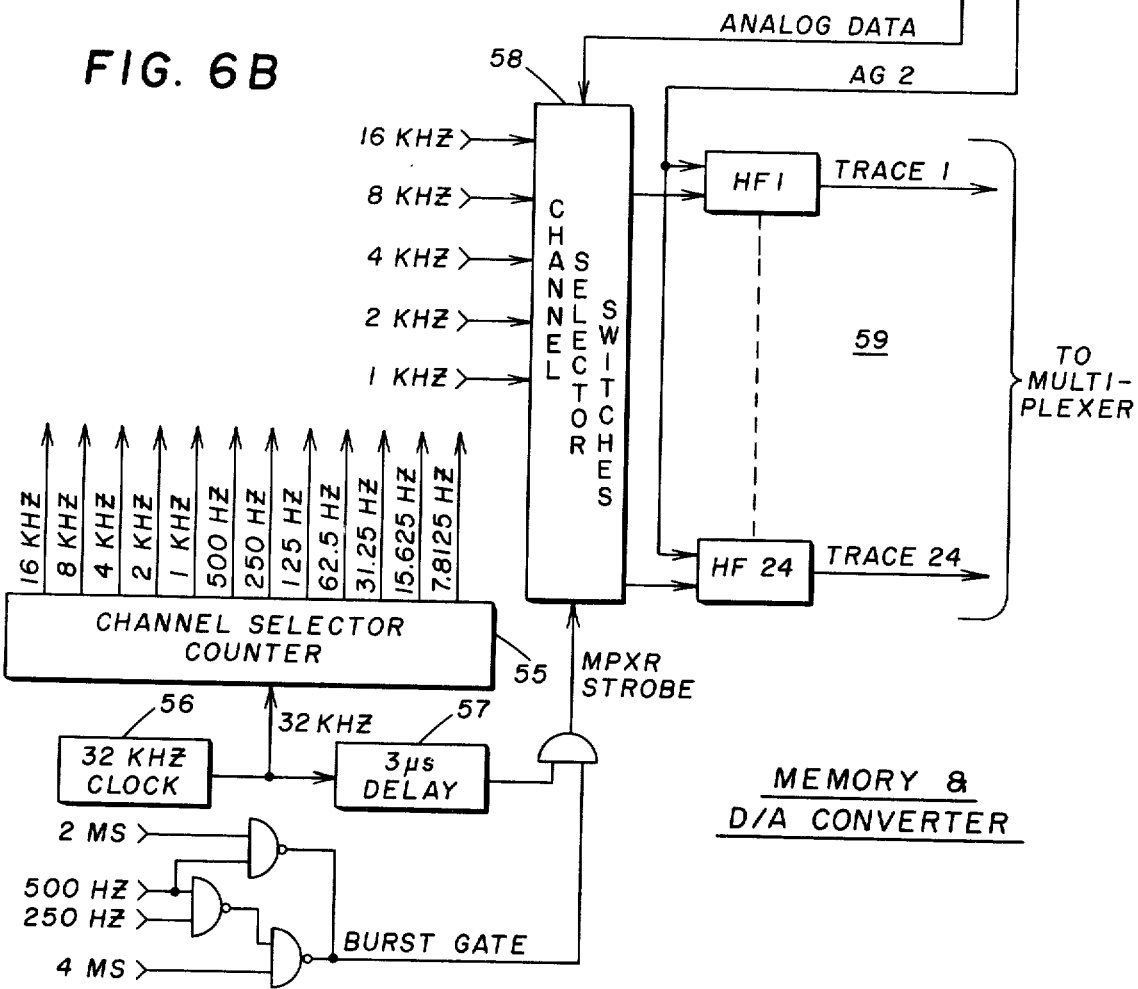
MEMORY & D/A CONVERTER

UNITS CONTROLLER

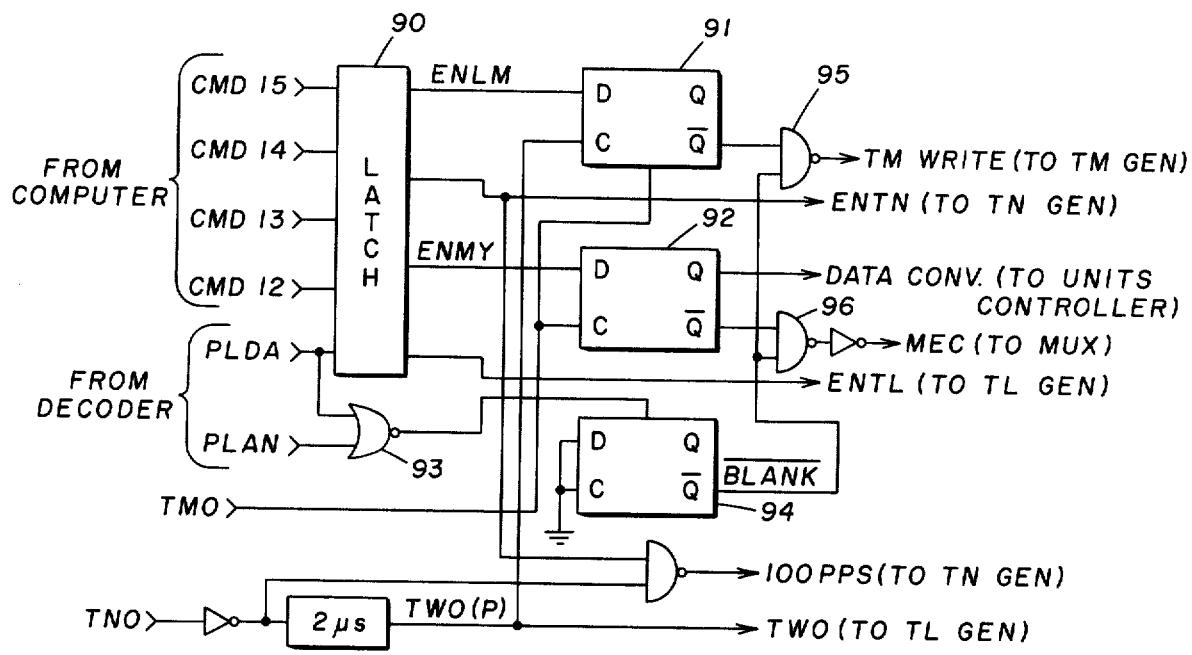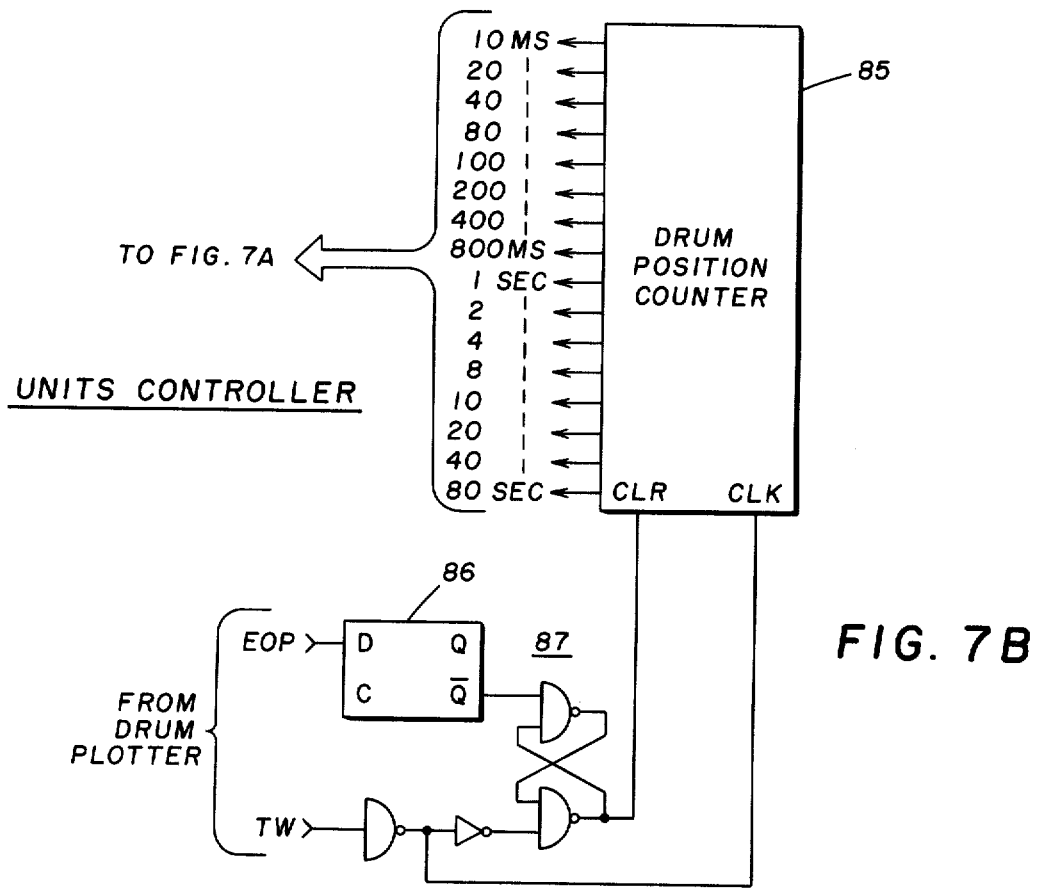
FIG. 7B

HOLD & FILTER

APPARATUS FOR CONTROLLING THE TRANSFER OF SEISMIC DATA FROM MAGNETIC TAPE STORAGE TO A PHOTOGRAPHIC RECORDING

BACKGROUND OF THE INVENTION

Seismic data representing a plurality of seismic channels is conventionally digitized and stored on magnetic tape for further data processing. In one such data processing operation, the information stored on the magnetic tape is used to modulate a cathode-ray tube so as to display the information on the face of the cathode-ray tube. Such display can then be photographically reproduced by means of a conventional drum plotter. The photographic reproduction obtained is a series of traces, one such trace for each seismic channel, recorded in a parallel relationship. In such data processing operations, the digitized seismic data stored on magnetic tape is converted to seismic analog signals. These analog signals are then multiplexed so as to provide intensity-modulation pulses for application to the electron beam of a cathode-ray tube as it sweeps across the face of the display. One intensity-modulation pulse is provided during each sweep of the electron beam for each of the seismic channels. Rotation of the drum plotter past the face of the cathode-ray tube results in each sweep of the electron beam being recorded on the drum plotter in a position displaced from the previous sweep, resulting therefrom in a series of seismic trace recordings on the photographic material surrounding the drum plotter. Timing lines are produced on the photographic material at fixed time intervals along the length of the seismic trace recordings.

Timing numbers can be photographically produced on the seismic trace to identify the timing lines in accordance with the teaching of U.S. Pat. No. 3,714,663 to Clarence G. Smith. Selected seismic traces can be marked with lines through the center of the traces for the entire length so that they are readily distinguishable from other seismic traces in accordance with the teaching of U.S. Pat. No. 3,704,450, also to Clarence G. Smith.

Further, the seismic traces may be annotated with alpha-numeric characters to identify such things as section type, area, shotpoint, etc., in accordance with the teaching of copending patent application Ser. No. 415,925, filed Nov. 14, 1973, of Clarence G. Smith and entitled SEISMIC TRACE ANNOTATION GENERATOR, now U.S. Pat. No. 3,886,526.

SUMMARY OF THE INVENTION

This invention relates to a seismic data processing system having a drum plotter for photographically reproducing seismic data in the form of a plurality of seismic traces. In this aspect, an interface controller is provided for generating timing and control signals in response to command signals from a computer. Such timing and control signals direct the rotational speed of the drum plotter and the rate at which the seismic data is photographically recorded on such plotter. In a further aspect, these signals selectively enable at the proper times a timing line generator, a timing number generator, a trace mark generator, and an annotation generator for the further recording of timing lines, timing numbers, centerline trace markings, and alpha-numeric annotation data for identifying the seismic traces on the recording.

More particularly, the computer issues a command which selects the rotational speed of the drum plotter and the data rate at which the electron beam at the cathode-ray tube is to be modulated. In this manner, each sweep of the electron beam is modulated with the seismic data one time for each of the plurality of seismic traces during each revolution of the drum plotter.

In a further aspect, the computer issues a command identifying the drum position at which the sweep of the electron beam of a cathode-ray tube is to be triggered. The cathode-ray tube is then triggered when the drum is rotated to the position identified by this command.

In a still further aspect, a timing line generator provides timing line signals which modulate the cathode-ray tube to provide for timing lines along the seismic trace recording. The computer generates a command which selects the drum position at which the cathode-ray tube is to be modulated to provide timing numbers for identifying selected ones of the timing lines. The cathode-ray tube is then modulated by means of the timing number generator when the drum is rotated to the position selected by the command.

In a yet further aspect, the computer generates a command which selects the drum position at which the cathode-ray tube is to be modulated to provide for the centerline marking of selected seismic traces. The cathode-ray tube is then modulated by means of the trace mark generator when the drum is rotated to the position selected by the command.

In a still further aspect, the computer generates a command to prepare the drum plotter for the recording of annotation data. After a predetermined number of drum revolutions following the generation of this command, the annotation generator is enabled to modulate the cathode-ray tube with the annotation data.

BRIEF DESCRIPTION OF THE DRAWINGS

FIG. 3 illustrates 24 seismic traces which have been recorded by the embodiment of the present invention.

FIGS. 4A and 4B are block diagram schematics of the interface controller of FIGS. 1 and 2.

FIG. 13 is a circuit schematic of the timing line generator unit of FIGS. 1 and 2.

DESCRIPTION OF THE PREFERRED EMBODIMENT

Figure 1:
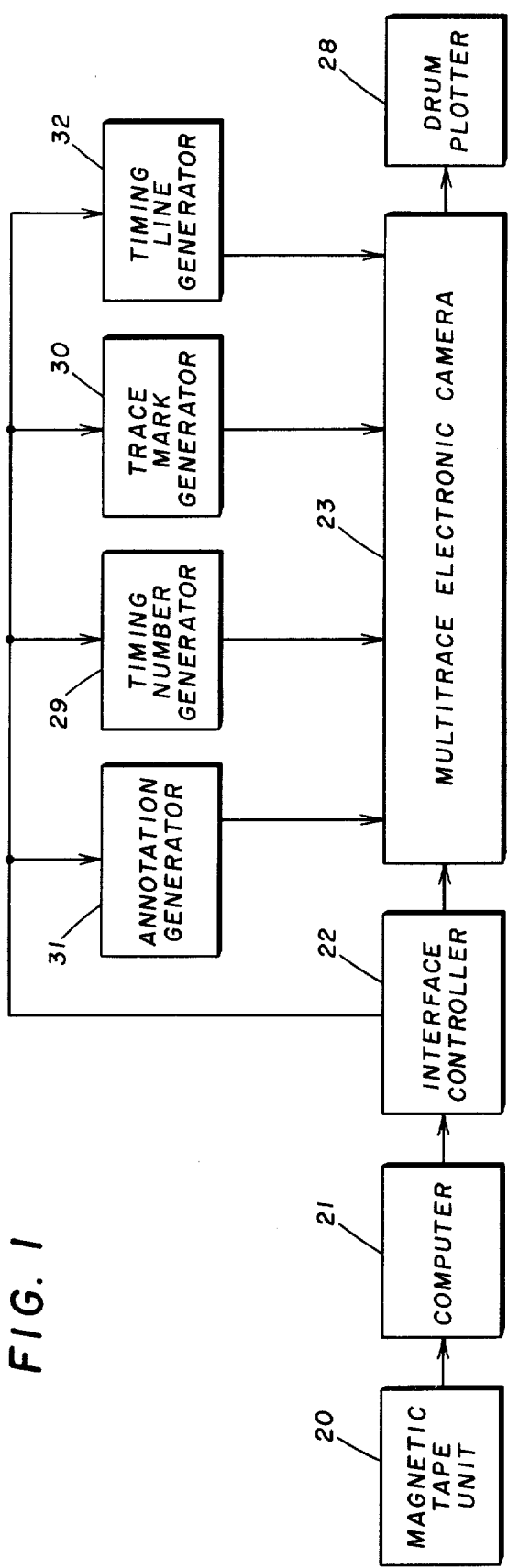
FIGS. 1 and 2 are block diagram schematics of one embodiment of the present invention.

A seismic trace display and photographic recording system is illustrated in FIG. 1. Such a system includes a magnetic tape unit 20 for supplying seismic trace analog signals to a computer 21. An interface controller 22 applies these signals to the multitrace electronic camera 23 for photographic reproduction by a drum plotter 28. The seismic traces photographically recorded are annotated with alpha-numeric information representing the operating conditions and location under which the seismic traces were originally recorded in the field. This annotation information is supplied by an annotation generator 31 to multitrace electronic camera 23. Also supplied to the multitrace electronic camera 23 is timing line information from a timing line generator 32 and timing number information from a timing number generator 29 for the marking of selected ones of the timing lines on the photographic recording with numeric characters identifying the time occurrences of the timing lines. Further, the multitrace electronic camera produces centerline markings for selected seismic traces under the control of a trace mark generator 30.

It is the specific feature of the present invention to provide for the interface controller 22 for controlling the operations of the above-described units of the seismic trace display and photographic recording system. A more detailed description of the operation of the seismic trace display and photographic recording system shown in FIG. 1 will first be presented, following which details of the operation of the interface controller of the present invention will be described.

Figure 2:
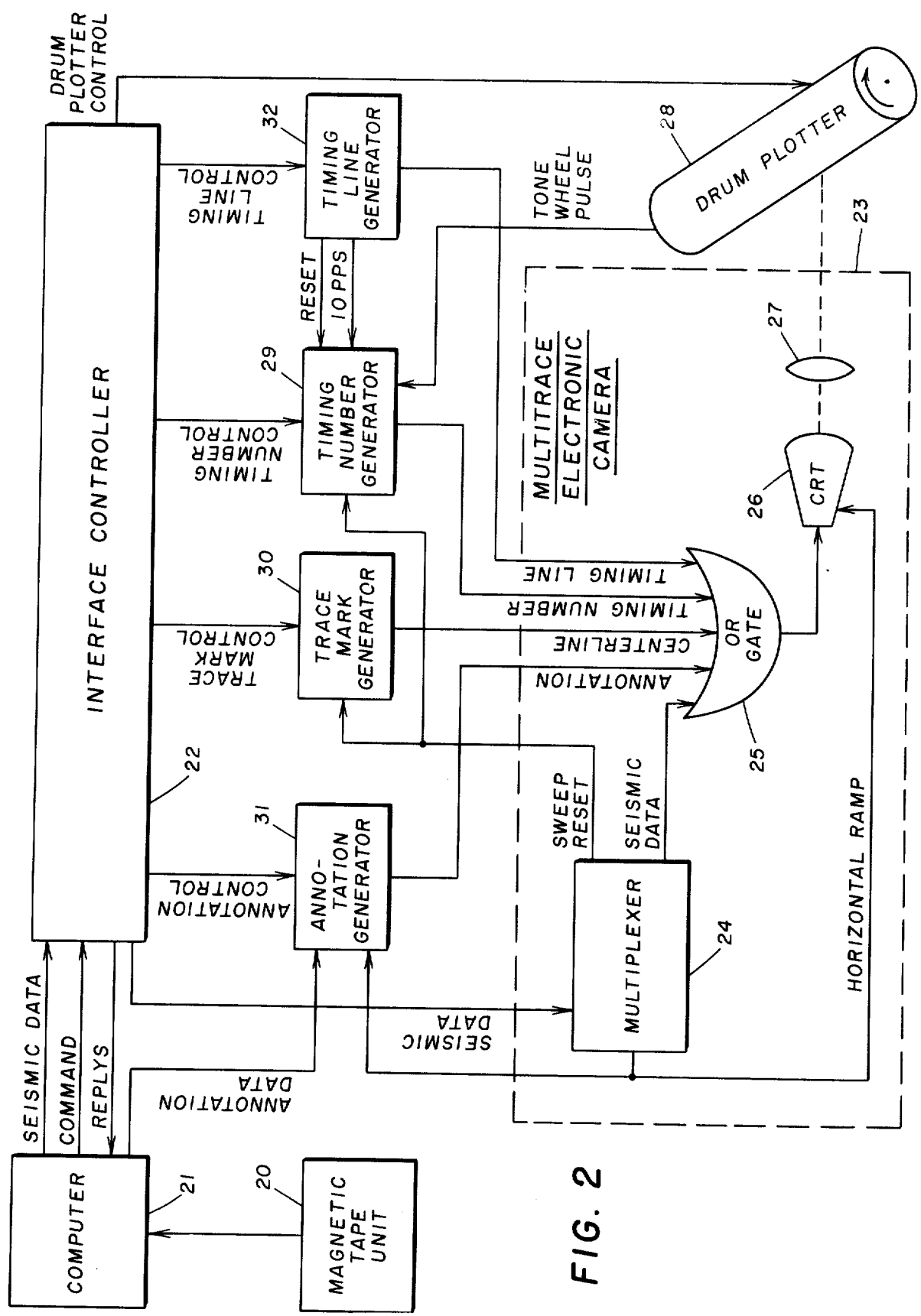

Referring now to FIG. 2, there is shown in block diagram one system embodying the present invention. A magnetic tape unit 20 converts seismic data representing, for example, 24 seismic channels to 24 seismic analog signals. These seismic analog signals are applied by way of a computer 21 and the interface controller 22 to a multitrace electronic camera 23. Multitrace electronic camera 23 comprises a multiplexer 24, an OR gate 25, a cathode-ray tube 26, and a lens 27. The multiplexer accepts and converts the 24 channels of seismic analog signals to multiplexed seismic data. The multiplexed data is then applied by way of OR gate 25 to cathode-ray tube 26 for intensity modulation of the electron beam. Multiplexer 24 also supplies to the cathode-ray tube a horizontal ramp signal for controlling the sweep of the electron beam across the face of the cathode-ray tube. The multiplexed data successively intensity modulates the electron beam one time during each sweep of the electron beam across the face of the cathode-ray tube for each of the 24 seismic channels. The display on the face of the cathode-ray tube is focused by lens 27 onto a plotter 28. Plotter 28 comprises a rotatable drum around which is placed a photosensitive film or paper on which is recorded the display presented on the face of cathode-ray tube 26. Each successive sweep of the electron beam on the face of the cathode-ray tube is photographically reproduced on plotter 28 in a side-by-side relationship.

A magnetic tape unit suitable for use with the foregoing-described system is the T.I. 951, a digital transport manufactured by Texas Instruments Incorporated, Dallas, Tex. The T.I. 951 stores magnetic tape input digital data in the memory of a computer 21. One such computer which is suitable for use with the present invention is the T.I. 980A, also manufactured by Texas Instruments Incorporated. The computer 21 sorts and transfers digital data to a buffer memory. The buffer memory transfers words under clock control to a digit register for conversion to analog signals. The analog signals are applied to the multiplexer 24 for transfer to multitrace electronic camera 23. The memory buffer controls the net data rate from the magnetic tape to prevent the overflow or emptying of the memory until the transfer of analog signals to the multiplexer 24 is complete. This ensures that the subsequent display of the analog signals on the cathode-ray tube 26 of the multitrace electronic camera 23 will be at a continuous and uniform data rate.

A multitrace electronic camera suitable for use in the system described herein in the Model MEC–630–A manufactured by Geospace Corporation of Houston, Tex. Such multitrace electronic camera comprises a multiplexer 24 which contains 24 seismic signal multiplexers, one for each seismic channel. The multiplexers convert the seismic analog signals to pulse width modulation signals suitable for cathode-ray tube presentation. These modulation signals intensity modulate the electron beam as it sweeps across the face of cathode-ray tube 26. A linear sweep or horizontal ramp signal of 250 microseconds' duration is generated and applied to the cathode-ray tube to control the sweep of the electron beam across the face of the display. The horizontal ramp signal also gates the 24 multiplexers ON and OFF once for each sweep of the electron beam or every 250 microseconds. The 24 multiplex outputs are applied by gate 25 to cathode-ray tube 26.

A plotter suitable for use with the system described herein is the PL–600 Series Cross-Section Plotter manufactured by Dresser SIE, Inc., Houston, Tex. The PL–600 Cross-Section Plotter produces a 5.5-second photographic record at the rate of 7.5 inches per second. The multitrace electronic camera 23 exposes only a small portion of the total plotter width in a given 24-seismic-trace plot. In order to plot additional 24-seismic-trace recordings adjacent to previous recordings, the camera is mounted on a movable assembly which may be automatically stepped laterally to the next 24-seismic-trace recording position.

The timing line generator 32 controls the recording on the plotter of three different widths of timing lines for 10-millisecond, 100-millisecond, and 1-second intervals.

The timing number generator 29 allows every 100 milliseconds of recording on the plotter 29 to be marked by a timing number adjacent to the 100-millisecond timing line. FIG. 3 represents the reproduction of, for example, three seismic traces on a 5.5-second photographic record. The 100-millisecond timing lines illustrated occur at 0.0, 0.1, 2.7, 2.8, 2.9, 5.3, 5.4, and 5.5 seconds. Applied to the timing number generator are the inputs: sweep reset, TL reset signal, 10-PPS signal, and 100-PPS signal. The sweep reset is a pulse produced by the multiplexer 24 at the beginning of each horizontal ramp signal. The 10-PPS signal is the output of the timing line generator in the interface controller 22. The TL reset signal is a timing line reset signal which is synchronized with the rotation of the plotter drum. The 100-PPS signal is a pulse generated by the plotter approximately 10 microseconds prior to the TL reset signal. These four input signals control the basic operation of the timing number generator to provide the timing number signals to the cathode-ray tube to intensity modulate the electron beam at the appropriate time during those sweeps of the electron beam necessary for the production of a timing number on the seismic trace recording. For a more complete understanding of the operation of the timing number generator, reference may be made to the aforementioned U.S. Pat. No. 3,714,663 to Smith.

The trace mark generator 30 allows selected seismic traces reproduced on the plotter 28 to be marked by a single line drawn down the center of the seismic trace for the portion prior to time zero or the entire length of the trace. Any number of the seismic traces may be centerline marked and are selected by selector switches within the generator. The sweep reset pulse from multiplexer 24 is also applied to trace mark generator 30 at the start of each horizontal ramp signal to initiate the production of centerline pulses. Generator 30 produces a centerline pulse once during each sweep of the electron beam across the face of the cathode-ray tube for each seismic trace selected by the setting of its selector switches. These centerline pulses are applied by gate 25 to the cathode-ray tube 26 for the centerline marking of the seismic traces. For a more complete understanding of the operation of the trace mark generator, reference may be made to the aforementioned U.S. Pat. No. 3,704,450 to Smith.

The annotation generator 31 controls the plotting at a desired location around the drum of alpha-numeric data. This data may be used to annotate the seismic data to be plotted. The computer 21 supplies the annotation data to be plotted to the annotation generator along with various command signals for controlling the actual plotting of the annotation data. The Texas Instruments Model 980A Computer, for example, supplies 64 ASC II characters of data and various commands by way of two input/output data modules, one module handling the data and the other module handling the commands. The annotation generator under control of the computer will in turn control the plotting of 32 characters per line on the plotter 28 with different size and space selections. Multiplexer 24 also applies each horizontal sweep signal to the annotation generator 31 to initiate transfer of the annotation data of alpha-numeric characters by way of OR gate 25 to the cathode-ray tube 26.

Each alpha-numeric character is in the digital form of a 5-bit × 7-row matrix. In order, however, to write a line of characters across the face of the CRT 26, the five bits of the first row of each character matrix to be recorded in a line are sequentially multiplexed onto the annotation output to be used to modulate the electron beam during its sweep across the face of the CRT. Then, the five bits of the second row of each character are sequentially multiplexed onto the annotation output line, and so on through each of the seven rows to complete the 5-bit × 7-row matrix for each character in a line of characters. The timing of the annotation generator 31 is synchronized with the horizontal sweep signal from the CRT 26 so that the five bits of each character occur within a specified time frame along each sweep of the electron beam across the face of the CRT 26. As the annotation data is then displayed on the face of the cathode-ray tube by successive sweeps of the electron beam, it is photographically reproduced on plotter 28. FIG. 3 represents the reproduction of, for example, 24 seismic traces on a 5.5-second photographic record with accompanying annotation data such as section type, area, shotpoint, etc.

With the foregoing understanding of the seismic trace display and photographic recording system as illustrated in FIGS. 1–3, there will now be described a specific embodiment of the interface controller 22 of the present invention.

Figure 4B:
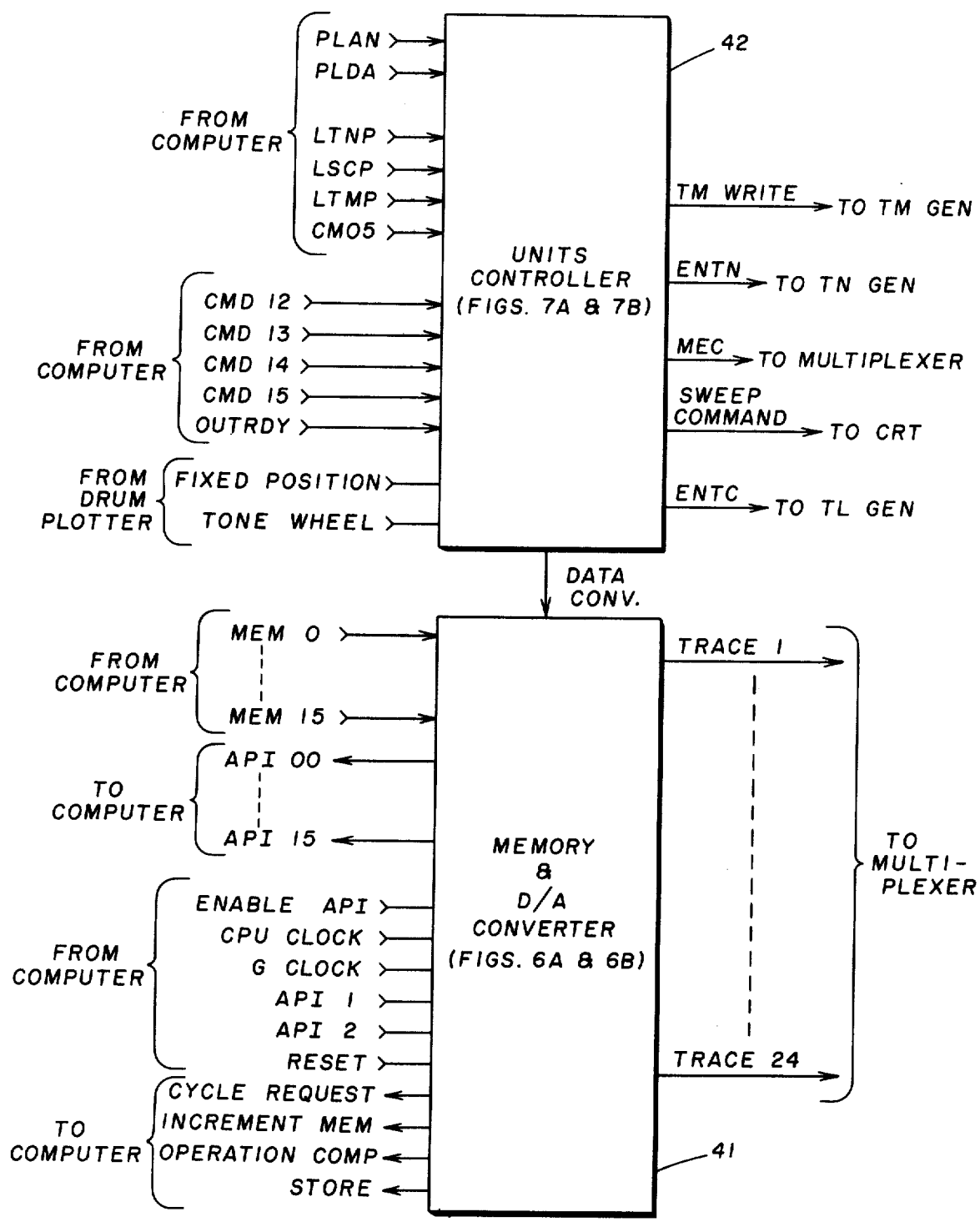

Referring now to FIGS. 4A and 4B, the interface controller includes the units 40–45. FIG. 4A illustrates a decoder 40; timing number, trace mark, and annotation generator loading latches 43; a drum plotter control 44; and a drum speed and data rate control 45. FIG. 4B illustrates a memory and digital-to-analog converter 41 and a units controller 42. All of the data signals, command signals, and control signals associated with the operation of each of these units 40–45 are also illustrated in FIGS. 4A and 4B. A more complete understanding of the interface controller may be had by referring to the detailed configuration of each of these units as illustrated in the drawings.

Figure 5:
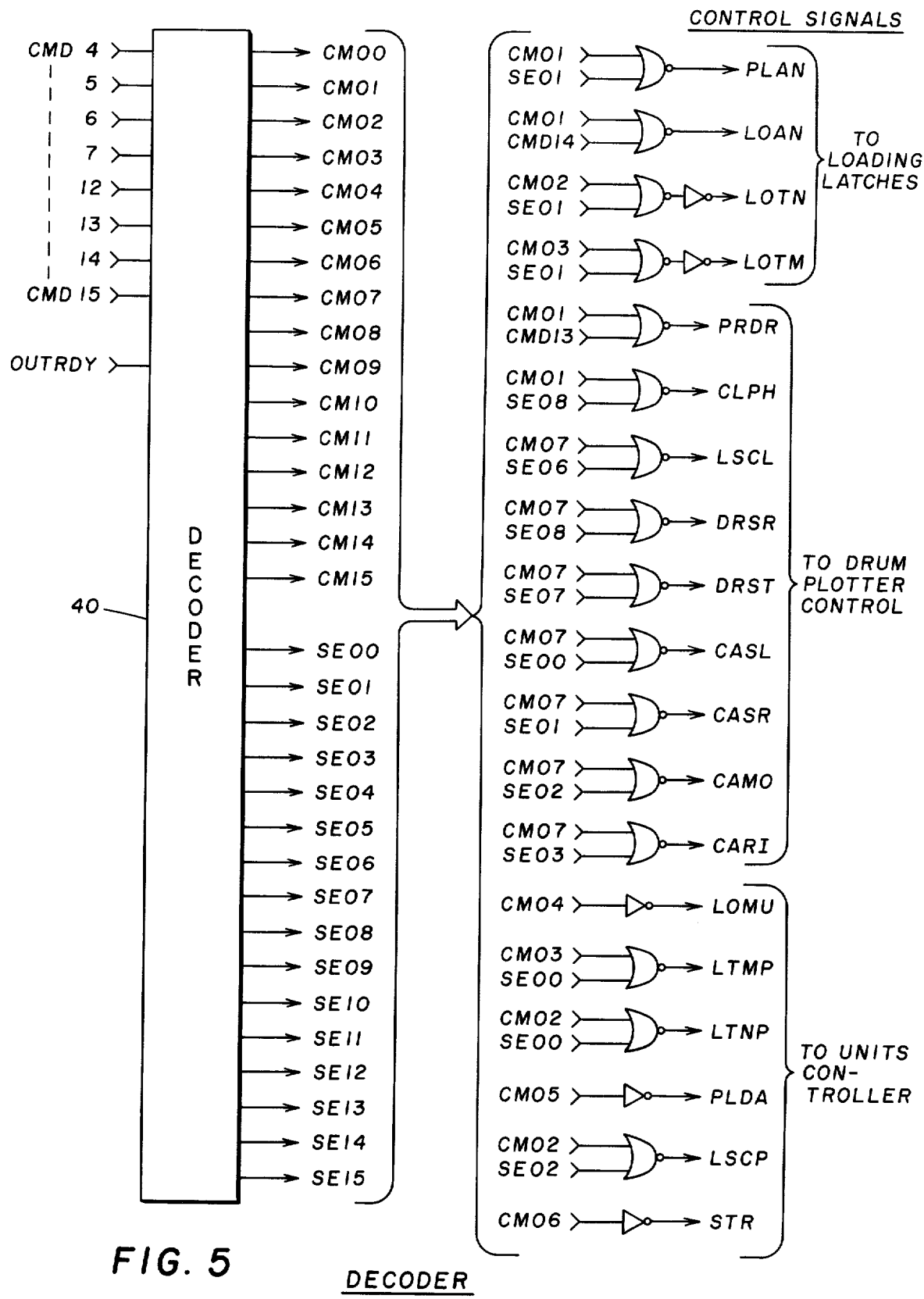
FIGS. 5; 6A and 6B; 7A and 7B; 8A and 8B; and 9–12 are circuit schematics of the various units illustrated in FIGS. 4A and 4B.

Decoder (FIG. 5)

Command signals CMD 4–7 and CMD 12–15 from the computer 21 are applied to the decoder 40. These commands are selectively gated to provide for a plurality of further command signals CM00–CM15 and a plurality of selector signals SE00–SE15. These signals are then selectively gated to provide for control signals which initiate the operation of the units controller 42, the loading latches 43, and the drum plotter 44. The function of these control signals will be described in conjunction with the operation of each of the units 42–44.

Memory and D/A Converter (FIGS. 6A and 6B)

Referring to FIG. 6A, the API 1 and API 2 control signals from the computer 21 initiate control of operations by the interface controller. These signals are applied to a control unit 50 (illustrated in detail in FIG. 12). An initial address from the central processing unit of the computer in the form of MEM 0 – MEM 15 signals is placed in a scratch pad memory 51. The control unit 50 is clocked in response to the CPU clock and the enable signal ENAPI from the computer to produce a WRITE signal and the ADD 1 – ADD 16 signals for loading 24 channels of seismic data from the core memory of the computer into the scratch pad memory 51 through the inputs MEM 0 – MEM 15. The WRITE signal enables the AND gates 52 to pass the ADD signals to the scratch pad memory. This seismic data is loaded into 24 initial addressing positions at the data rate of the CPU clock from the computer. The detailed description of the control unit 50 in controlling the loading of seismic data into the scratch pad memory 51 will be more fully described in conjunction with FIG. 12.

Figure 11:
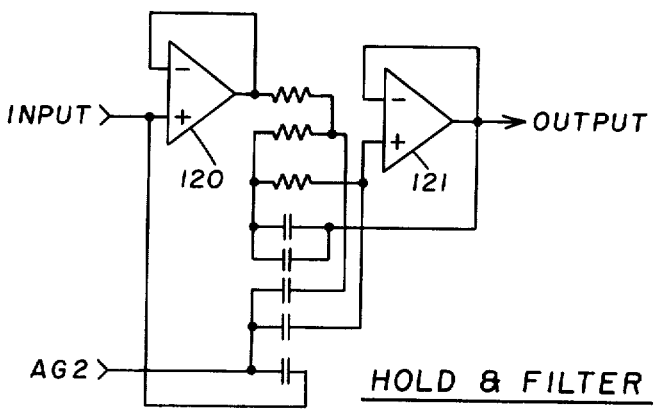

Referring now to FIG. 6B in conjunction with FIG. 6A, upon completion of the storage of 24 channels of seismic data in the memory 51, the seismic data is applied to the D/A converter 53. This operation is initiated by the READ signal from control unit 50. The READ signal enables gates 54 to pass the 1-KHZ – 16-KHZ clocks to the memory 51. These clocks strobe the seismic data out of the memory along the output lines $\overline{\text{BIT 00}}$–$\overline{\text{BIT 14}}$. These clock signals are produced by the channel selector counter 55 in response to the 32-KHZ clock 56. The 32-KHZ clock signal is also delayed by the 3μs delay 57 and gated with the 2-ms, 500-HZ, 250-HZ, and 4-ms signals from the drum speed and data rate control unit 45 (FIG. 4A) to provide for the MPXR strobe to 24 channel selector switches 58. The analog seismic data from the D/A converter 53 is then strobed into one of the hold and filter channels 59 at the MPXR strobe rate through the particular channel selector switch that is turned ON by the clock pulses 1-KHZ – 16-KHZ from the channel selector counter 55. The seismic data in the hold and filter channels 59 is then sequentially sampled by the multiplexer 24 of the multitrace electronic camera 23 and turned into modulation control pulses for the electron beam of the CRT 26. A hold and filter channel is illustrated in detail in FIG. 11 and includes the two operational amplifiers 120 and 121. The hold and filter circuit 59 is set up such that the seismic data sample connected to the input of amplifier 120 by the channel selector switch 58 can be held until the selector switch 58 selects it again and changes the sample. The rate of change of the samples is attenuated above 100 HZ at the rate of 18 DB/octave.

Figure 10:
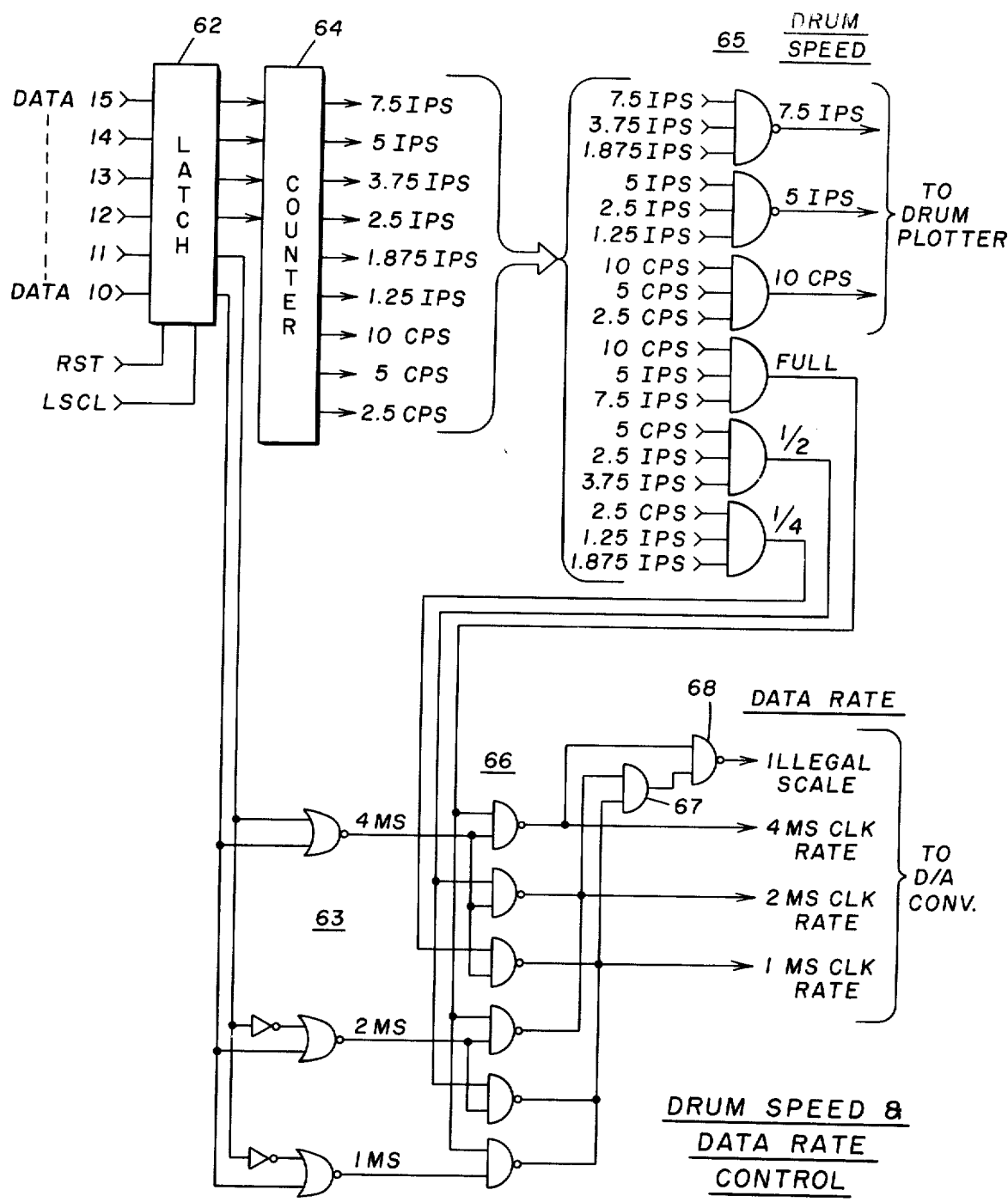

Drum Speed and Data Rate Control (FIG. 10)

The drum speed and data strobing rate are controlled by DATA bits 12–15 and DATA bits 10–11, respectively. The LSCL command from decoder 40 initiates a single data word transfer into the latch 62 by way of inputs DATA 10 – DATA 15. Data word bits DATA 10 and DATA 11 are decoded by gates 63 to provide for the data rates of 1 ms, 2 ms, and 4 ms as follows:

| Bit 10 | Bit 11 | Data Rate |
|---|---|---|
| 0 | 0 | 4 ms |
| 0 | 1 | 2 ms |
| 1 | 0 | 1 ms |

Data bits DATA 12 – DATA 15 are decoded by the counter 64 to provide for a plurality of recording scales in inches per second (ips) and centimeters per second (cps) as follows:

| Bit 12 | Bit 13 | Bit 14 | Bit 15 | Scale | |
|---|---|---|---|---|---|
| 0 | 0 | 0 | 0 | 7.5 | ips |
| 0 | 0 | 0 | 1 | 5.0 | ips |
| 0 | 0 | 1 | 0 | 3.75 | ips |
| 0 | 0 | 1 | 1 | 2.5 | ips |
| 0 | 1 | 0 | 0 | 1.875 | ips |
| 0 | 1 | 0 | 1 | 1.25 | ips |
| 0 | 1 | 1 | 0 | 10 | cps |
| 0 | 1 | 1 | 1 | 5 | cps |
| 1 | 0 | 0 | 0 | 2.5 | cps |

These data rates and scales are further gated by gates 65 and 66 to provide for three drum speeds of 7.5 ips, 5 ips, and 10 cps and three data rates of 1 ms, 2 ms, and 4 ms. These gates further provide for full-scale data recording at 1-ms, 2-ms, and 4-ms data rate; for one-half scale data recording at 2-ms and 4-ms data rate; and one-fourth scale data recording at 4-ms data rate. The drum speed signals are applied to the drum plotter, while the data rate signals are applied to the memory and D/A converter 41. Any combination of scales other than full, one-half, or one-fourth will cause gates 67 and 68 to produce an illegal scale signal that is applied to memory and D/A converter 41 to clock the seismic data out at the maximum data rate.

Figure 7A:
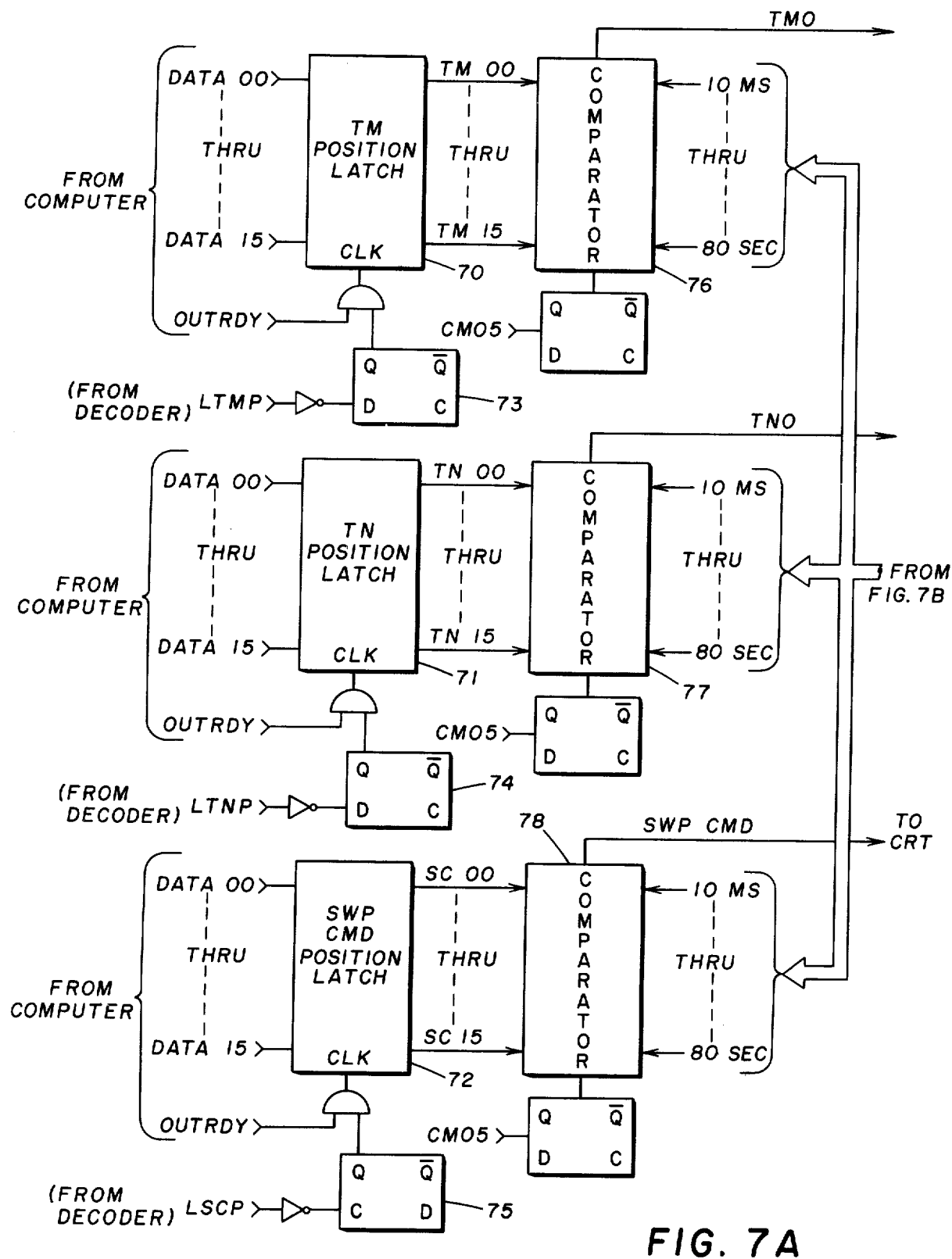

Units Controller (FIGS. 7A and 7B)

Referring to FIG. 7A, after the data rate and drum speed have been set the next computer command DATA 00 – DATA 15 instructs the units controller 42 as to how the seismic data is to be laid out around the drum plotter. This command contains the drum position count at which the trace mark generator 30 will begin outputting data to the CRT, the drum position count at which the timing number generator will begin outputting data to the CRT, and the position of the drum counter 85 (FIG. 8B) at which the CRT will be triggered. The command is applied to the inputs of three position registers 70, 71 and 72. Upon the generation of the LTMP control by decoder 40, the flip-flop 73 is set to load the command into the trace mark latch register 70. The LTNP control sets flip-flop 74 to load the timing number latch register 71. The LSCP control sets flip-flop 74 to load the sweep command latch register 72.

These three positions of the drum need to be detected as the drum plotter revolves and compared with the position commands stored in registers 70–72. Referring to FIG. 7B, the drum position counter 85 is clocked by the EOP and TW control pulses from the drum plotter. The EOP pulse is produced each time a fixed point on the drum revolves past a stationary reference position. It is applied through flip-flop 86 and latch 87 to clear the drum position counter 85. The TW pulse is a tone wheel signal produced at 10-ms intervals as the drum is rotated. The TW pulses are counted in the drum position counter 85 which provides a total count output from 10 milliseconds through 80 seconds.

The total count outputs of counter 85 are applied to comparators 76, 77, and 78 of FIG. 7A where they are compared with the trace mark, timing number, and sweep command positions, respectively. Upon coincidence in the comparator 76, the TMO signal is generated for use in instructing the trace mark generator to begin outputting trace mark data. Upon coincidence in the comparator 77, the TNO signal is generated for use in instructing the timing number generator to begin outputting timing number data. Upon coincidence in the comparator 78, the sweep command signal is generated to trigger the sweep of the CRT.

The units controller 42 of FIG. 7B further includes a latch 90 to which the command bits CMD 12 – CMD 15 and the PLDA control signal are applied. These inputs control which kind of data is to be placed, seismic data, trace mark data, timing number data, and/or timing lines. The PLDA control loads the latch with the plot command bits CMD 12 – CMD 15. The latch output is either an ENLM, enable trace mark; ENTN, enable timing number; ENTL, enable timing line; or ENMX, enable multiplexer signal. The ENLM and a 2µs delayed TNO signal control latch 91 to produce the TM write signal that is applied directly to the trace mark generator 30 to enable trace marking. The ENTN is applied directly to the timing number generator 29 to enable timing numbers. The ENTL is applied directly to the timing line generator 32 to enable timing lines. THe ENMX and the TMO signal control latch 92 to produce the MEC signal and the DATA CONV signal. The DATA CONV enables the D/A converter 53 to begin accepting seismic data from the scratch pad memory 51. The MEC signal enables the multiplexer 24.

If a PLAN control is produced by decoder 40, which is a plot annotation control, and/or a PLDA, plot seismic data, control is present, then gate 93 sets latch 94 to produce an unblanking signal. When the CRT is blanked, the TM write output gate 95 and the MEC output gate 96 are enabled for calibration purposes.

Figure 9:
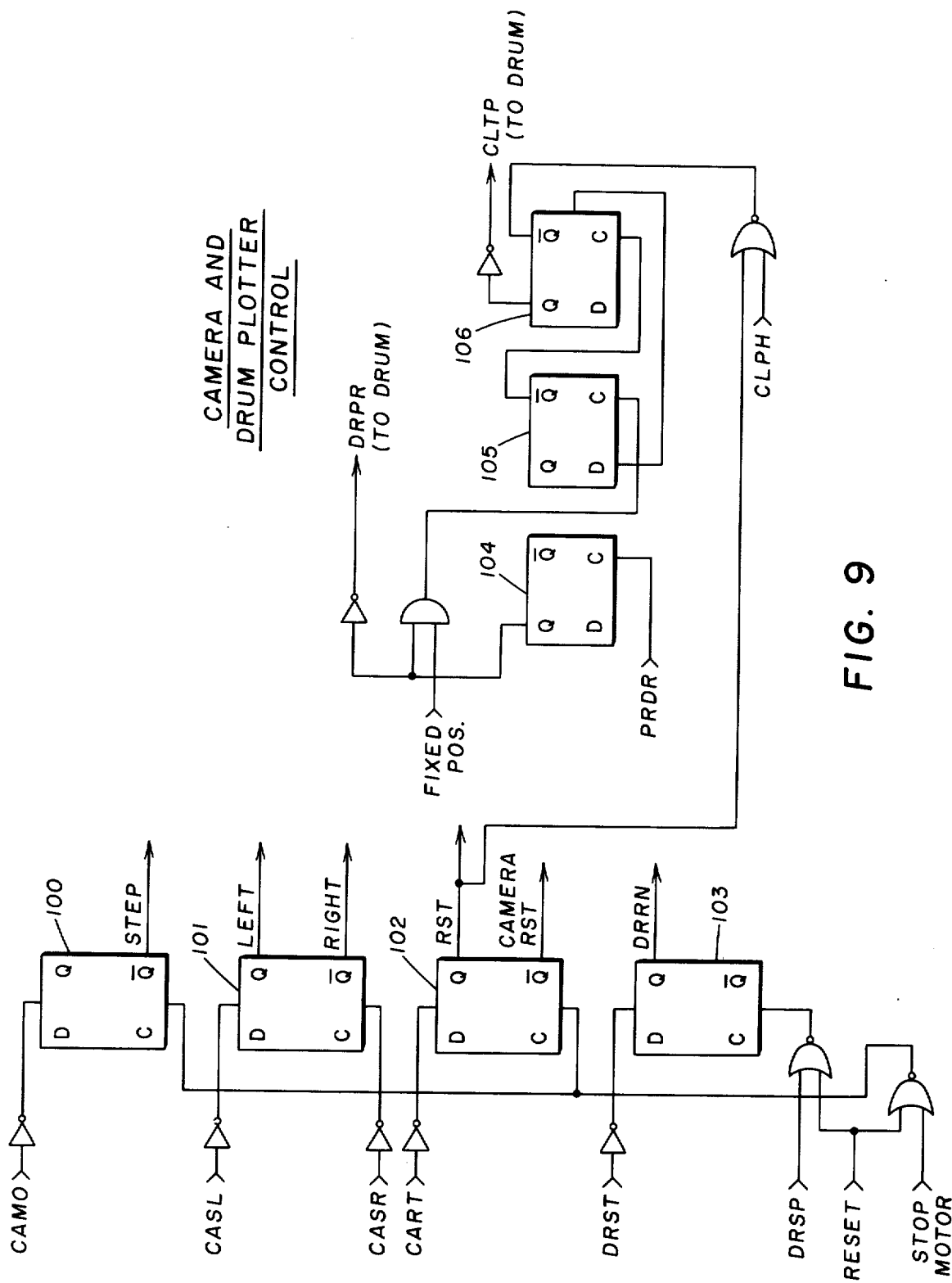

Camera and Drum Plotter Control (FIG. 9)

The CAMO control sets flip-flop 100 to set the camera moving in the step mode. The CASL and CASR controls set the camera movement direction to left and right, respectively, across the face of the drum plotter through the setting of flip-flop 101. The CART control resets the camera movement to a predetermined limit through flip-flop 102.

The DRST control sets flip-flop 103 to provide the DRRN signal to the drum plotter. DRRN starts the drum turning at the speed selected by the drum speed and data rate control unit 45 in response to the LSCL control. The DRSP control stops the drum rotation through the reset of flip-flop 103.

The PRDR control sets latch 104 to provide for the DRPR signal to the drum plotter. This signal prepares the drum for the plotting of annotation data. The end-of-plot position on the drum, as indicated by the fixed position pulse, must make two passes by the CRT before the CRT unblanks to begin plotting annotation data. After two passes, the latches 105 and 106 will have been set by the fixed position pulse to provide the CLTP signal which indicates that the drum is now clear for annotation plotting.

The CLPH control from the decoder 40 is used as a reset to flip-flop 106 to clear the prepare-drum-state of drum plotter.

Figure 8A:
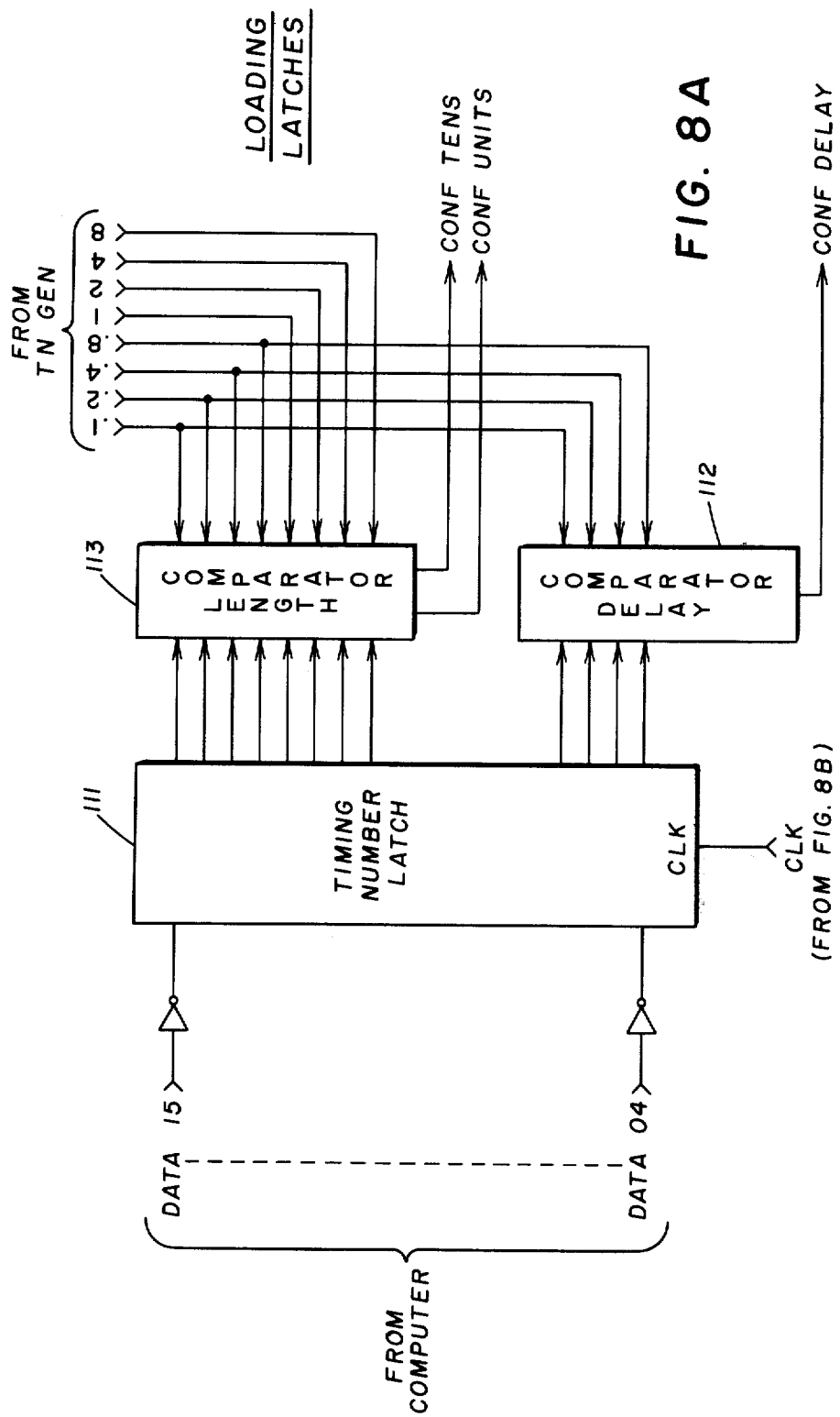
Figure 8B:
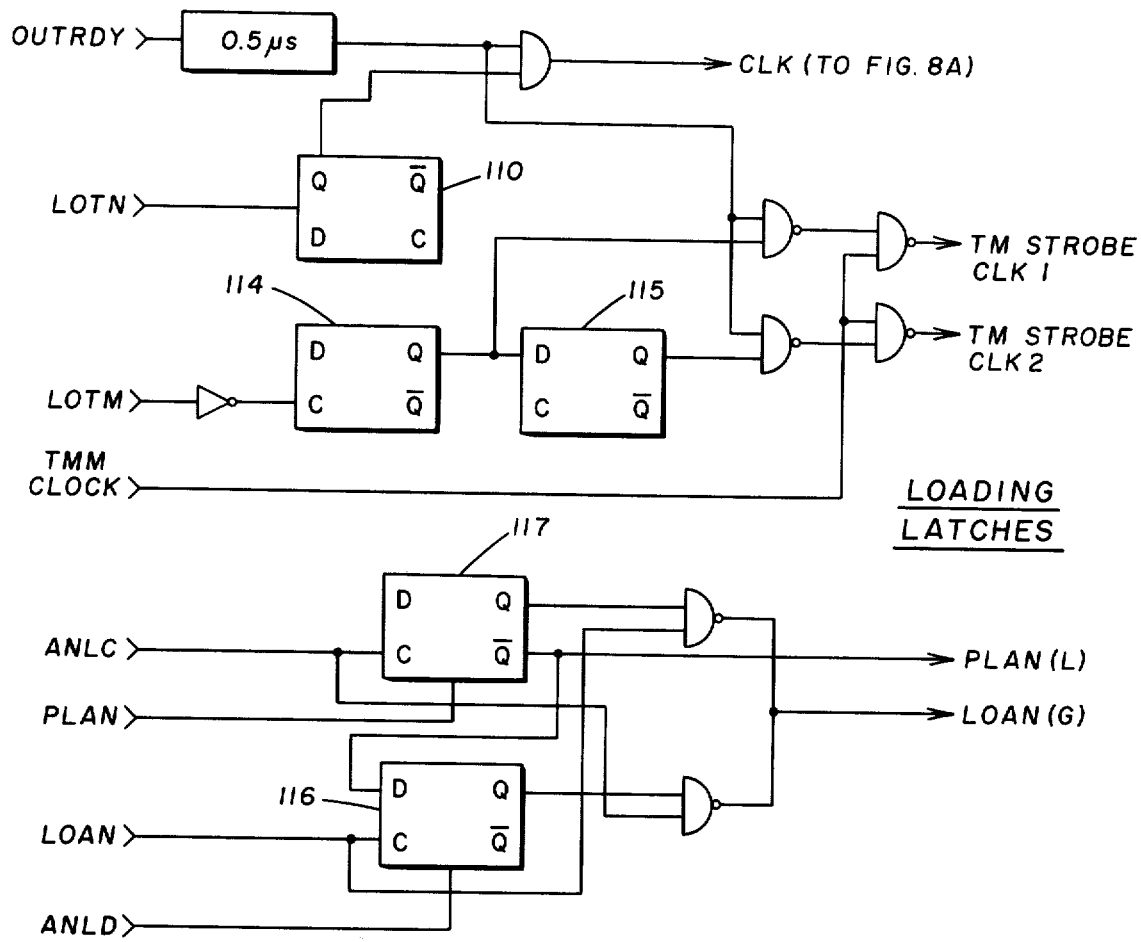

Loading Latches (FIGS. 8A and 8B)

Referring to both FIGS. 8A and 8B, the LOTN control sets flip-flop 110 of FIG. 8B to enable timing number latch 111 of FIG. 8A to receive the DATA 04 – DATA 15 bits from the computer. DATA 04 – DATA 07 indicate the length of delay in tenths of a second from the time a timing number position is detected to the start of plot position. DATA 12 – DATA 15 and DATA 08 – DATA 11 indicate the length of the timing number plot in seconds and tenths of a second, respectively. Upon coincidence of the actual delay from the timing number generator with the delay indicated by DATA 04 – DATA 07, the delay comparator 112 produces the CONF DELAY signal to the timing number generator to start the plotting of timing numbers. Similarly, upon coincidence of the actual length of the timing number plot from the timing number generator with the length indicated by DATA 08 – DATA 15, the length comparator 113 produces the CONF TENS and CONF UNITS signals. These CONF pulses are applied to the timing number generator to stop the plotting of timing numbers.

The LOTM control sets flip-flops 114 and 115 of FIG. 8B to produce the TM strobe signals CL K1 and CL K2, respectively. These strobe signals are applied to the trace mark generator to load it with trace marking data from the computer. LOTM first sets flip-flop 114 and the TM strobe CL K1 instructs the trace mark generator to take the first 12 bits of data off the line from the computer. Flip-flop 114 then ripples into flip-flop 115 and the TM strobe CL K2 then instructs the trace mark generator to take the second 12 bits of data off the line from the computer.

The LOAN control sets flip-flop 116 to produce the LOAN(G) signal that is used to begin loading a line of annotation data from the computer into the annotation generator memory.

The PLAN control sets flip-flop 117 to produce the PLAN(L) signal that is used to unblank the CRT and start the clocking of data out of the annotation generator memory in synchronism with the sweep reset. This signal is issued for each line of annotation data to be plotted.

Figure 12:
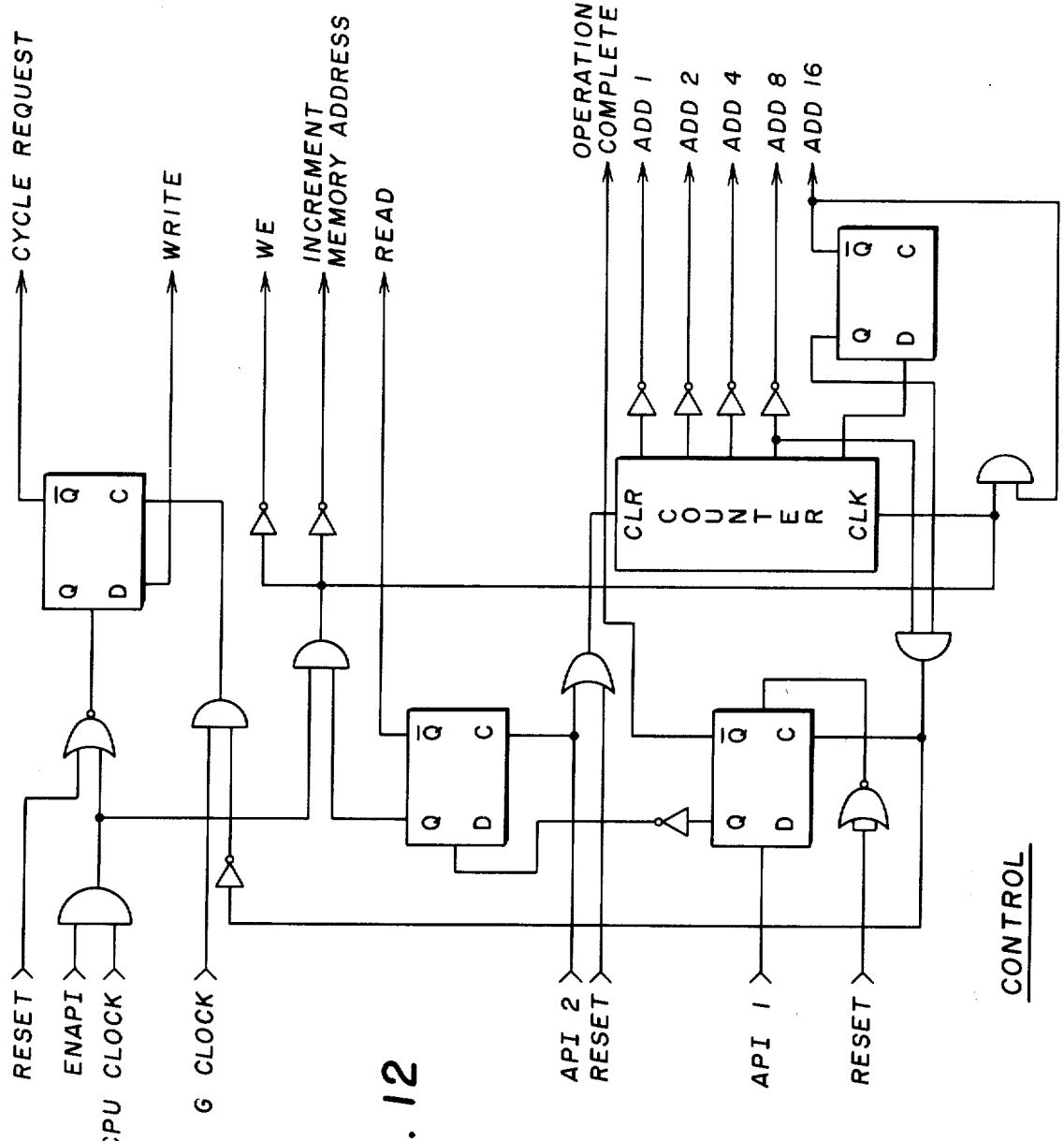

Control Unit 50 (FIG. 12)

The control unit 50 controls the transfer of digital seismic data from the computer 21 into the memory and D/A converter 41 in response to the API 1 and API 2 control signals from the computer. These signals instruct the control unit 50 to take over control of operation from the computer 21 which is placed in a "stall" condition at the generation of the API 2 control signal. The enable signal ENAPI and the CPU clock, both from the computer 21, are applied to AND gate 130. Upon coincidence of each clock pulse with the ENAPI signal, gate 131 sets flip-flop 132 to provide a WRITE signal. Flip-flop 132 also produces a cycle request signal which is sent to the computer to request data. At the same time, the counter 133 is clocked at the CPU clock rate through gate 134 to produce the ADD 1 – ADD 16 signals. The WRITE signal enables the gates 52 (FIG. 6) to pass the ADD 1 – ADD 16 signals to the scratch pad memory 51 to load the scratch pad memory with 24 channels of seismic data that has been requested. In order for each ADD signal to strobe new data into the scratch pad memory, the memory of the computer is clocked by the increment memory address signal from gate 134 and inverter 135. The scratch pad memory is itself incremented by the WE pulse from inverter 136. After 24 CPU clock pulses, the counter 133 stops counting and provides a signal by way of gate 137, inverter 138, and gate 139 to reset flip-flop 132. This terminates the WRITE signal and cycle request signals. Gate 137 further sets flip-flop 140 to provide the operation complete signal to return control of operations to the computer. Flip-flop 140 also sets flip-flop 141 to provide for the READ signal that enables the gates 54 (FIG. 6) to pass the 1-KHZ – 16-KHZ clocks to the scratch pad memory for transferring the seismic data to the D/A converter 53.

Timing Line Generator (FIG. 13)

A tone wheel pulse TW is produced by the drum plotter every 10 milliseconds. The latches 130–132 and the plurality of gates 133 provide for a double-density timing line pulse TWP at 5-millisecond intervals if a DBTL control signal from the interface controller is present. Otherwise, the TWP pulses occur at 10-millisecond intervals.

Upon the presence of the TWO and ENTL controls to gate 137 from the interface controller, gate 134 applies the TWP pulses to the counters 135 and 136. If, however, timing lines are not to be recorded, there will be no ENTL control. A blank control from the interface controller to gate 138 sets gate 139 to enable gate 134 from passing the TWP pulses to the counters for calibration during blanking. After each blanking, a TL reset is applied to the timing number generator.

The first TWP pulses reset the counter 135 and the following TWP pulses (at either 5- or 10-millisecond intervals) are counted.

At each 10-millisecond interval, base current is supplied to the TL output transistor 140 through inverter 141. At each 100-millisecond interval, base current is supplied through inverter 141 and diode 142. At each 1-second interval, base current is supplied through inverter 141 and diodes 142 and 143. Consequently, there are three densities of timing lines, with the 10-millisecond lines being the lightest and the 1-second lines being the darkest.

The TW pulses from the drum plotter are not synchronized with the sweep reset pulses from the CRT. The TL store gate 144 and the TL write latch 145 operate to ensure that timing lines are not started until the start of each sweep of the CRT.

The FB reset is a control signal from the timing number generator. After each timing number delay, the FB reset pulse sets latch 146 and TL reset gate 147 to reset the counters 135 and 136.

Having described the interface controller of the present invention in conjunction with the circuitry illustrated in FIGS. 5–13, it is to be understood that such circuitry is merely representative of one embodiment. In accordance with such embodiment, the following sets forth specific types of circuit components.

| Reference Designation | Description |
|---|---|
| Memory 51 | Type 93403 Fairchild |
| All channel selector switches | Type 3705 Fairchild |
| All comparators | Type 9324 Fairchild |
| D/A converter 53 | UDAC No. 7309 Data Device Corp. |
| Delay 57 | MC 74121P Motorola |
| All operational amplifiers | MC 747/2 Motorola |
| Zener diodes | 1N746 |
| All other diodes | 1N463 |
| Transistor 140 | 2N3904 |
| All other decoders, flip-flops, gates, inverters, latches, counters, and delays | SN7400 Series Texas Instruments |

I claim:

1. In a seismic data processing system for photographically reproducing seismic data from a plurality of seismic channels including a multiplexer for successively applying seismic data for each of said plurality of seismic channels to a cathode-ray tube to successively intensity modulate the electron beam one time during each sweep of the electron beam across the face of said cathode-ray tube for each of said seismic channels, a timing line generator for applying timing line modulation signals to said cathode-ray tube, a timing number generator for applying timing number modulation signals to said cathode-ray tube, a trace mark generator for providing seismic trace centerline modulation signals to said cathode-ray tube, an annotation generator for applying alphanumeric modulation signals to said cathode-ray tube, and a drum plotter for photographically reproducing in a side-by-side relationship each sweep of said electron beam, the combination therewith of:
   a. a computer,
   b. a first command generated by said computer selecting the drum position at which the sweep of the electron beam of the cathode-ray tube is to be triggered,
   c. means for producing a drum position signal representative of the rotational position of said drum plotter,
   d. means for comparing said drum position signal with said first command and for triggering the sweep of the cathode-ray tube when the drum is in the rotational position selected by said sweep command,
   e. a second command generated by said computer selecting the rotational speed of said drum plotter and the data rate at which said cathode-ray tube is to be modulated by said seismic data,
   f. a decoder which converts said second command into a drum speed control signal and a data rate control signal,
   g. means for applying said drum speed control signal to said drum plotter to control its rotational speed,
   h. means responsive to said data rate control signal for controlling the rate at which said seismic data is applied to said multiplexer so that each sweep of the cathode-ray tube is modulated with the seismic data one time for each of said plurality of seismic traces during each revolution of said drum plotter, and
   i. means for selectively enabling said timing line generator, said timing number generator, said trace mark generator, and said annotation generator to modulate the electron beam sweep of said cathode-ray tube whereby said seismic data is photographically recorded on said drum plotter in a plurality of parallel and continuous seismic traces along with timing lines, timing numbers to identify selected timing lines, centerline marking of selected seismic traces, and annotation data.

2. The system of claim 1 in which said means for selectively enabling said timing line, timing number, and trace mark generators includes:
   a. a third command generated by said computer for enabling said timing line generator to apply timing line signals to said cathode-ray tube to modulate the electron beam sweep,
   b. a fourth command generated by said computer selecting the drum position at which the sweep of the electron beam of the cathode-ray tube is to be modulated to provide for timing numbers,
   c. means for comparing said drum position signal with said fourth command and for enabling said timing number generator to apply timing number signals to the cathode-ray tube to modulate the sweep of the electron beam when the drum is in the rotational position selected by said fourth command,
   d. a fifth command generated by said computer selecting the drum position at which the electron beam sweep of the cathode-ray tube is to be modulated by said centerline marking signals, and
   e. means for comparing said fifth command with the drum position signal for enabling said trace mark generator to apply said centerline marking signals to said cathode-ray tube to modulate the electron beam sweep when the drum is in the rotational position selected by said fifth command.

3. The system of claim 2 further including:
   a. a sixth command generated by said computer identifying a first time period from the first timing line to the timing line to be identified with a timing number,
   b. means for comparing said sixth command with the time occurrences of said timing lines and for enabling said timing number generator to identify the timing line that occurs after said first time period with a timing number,
   c. a seventh command generated by said computer identifying a second time period during which the cathode-ray tube is to be modulated to provide for said timing number, and
   d. means for comparing said seventh command with the length of time said timing number generator is enabled and for disabling said timing number generator when said length of time equals said second time period.

4. The system of claim 1 in which said means for enabling said annotation generator includes:

a. an eighth command generated by said computer indicating that said drum plotter is to be rotated to a predetermined position for recording annotation data, b. means for determining a count of the revolutions of said drum plotter after said eighth command has been generated, c. means responsive to said count for providing a control signal to said drum plotter to permit the recording of annotation data only after a predetermined number of counts have been made, and d. means responsive to said control signal for enabling said annotation generator to apply the alpha-numeric signals to said cathode-ray tube to modulate the electron beam sweep with said annotation data, whereby said annotation data is photographically recorded by said drum plotter.

* * * * *